(12) United States Patent
Drevon et al.

(10) Patent No.: US 8,646,574 B2
(45) Date of Patent: Feb. 11, 2014

(54) ACOUSTIC SKIN FOR AN AIRCRAFT NACELLE ACOUSTIC PANEL

(75) Inventors: Emmanuel Drevon, Anglesqueville l'Esneval (FR); Jean Ramain, Villainville (FR); Aurelien Tissot, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/511,260

(22) PCT Filed: Oct. 28, 2010

(86) PCT No.: PCT/FR2010/052311
§ 371 (c)(1),
(2), (4) Date: May 22, 2012

(87) PCT Pub. No.: WO2011/061430
PCT Pub. Date: May 26, 2011

(65) Prior Publication Data
US 2012/0228051 A1    Sep. 13, 2012

(30) Foreign Application Priority Data
Nov. 23, 2009   (FR) .................................. 09 05605

(51) Int. Cl.
*E04B 1/82* (2006.01)
*F01N 1/24* (2006.01)

(52) U.S. Cl.
USPC .......................................... 181/292; 181/222

(58) Field of Classification Search
USPC .......... 181/210, 211, 214, 222, 292; 156/292, 156/539
See application file for complete search history.

(56) References Cited

U.S. PATENT DOCUMENTS

| | | | | |
|---|---|---|---|---|
| 4,671,841 A * | 6/1987 | Stephens | ........................ | 156/292 |
| 6,268,038 B1 * | 7/2001 | Porte et al. | ..................... | 428/116 |
| 7,257,894 B2 * | 8/2007 | Buge et al. | ................. | 29/890.01 |
| 2001/0005937 A1 * | 7/2001 | Andre et al. | ............... | 29/888.01 |
| 2002/0157764 A1 | 10/2002 | Andre et al. | | |
| 2007/0154698 A1 * | 7/2007 | Stepanian | .................. | 428/294.7 |

FOREIGN PATENT DOCUMENTS

| | | |
|---|---|---|
| EP | 0897174 A1 | 2/1999 |
| EP | 1111584 A1 | 6/2001 |

OTHER PUBLICATIONS

International Search Report issued Mar. 21, 2011 by European Patent Office re: PCT/FR2010/052311; pp. 2; citing: US 2002/157764 A1, EP 0 897 174 A1, EP 1 111 584 A1 and US 2007/0154698 A1.

* cited by examiner

*Primary Examiner* — Jeremy Luks
(74) *Attorney, Agent, or Firm* — Brinks Gilson & Lione

(57) ABSTRACT

The invention relates to an acoustic skin (22) for an aircraft nacelle acoustic panel, said skin including a plurality of layers (105, 106) stacked with composite planar bands (102) that are each directed by the direction-defining longitudinal axis (107) thereof, the longitudinal axes (107) of the bands (102) of a single layer (105, 106) being parallel therebetween, said bands (102) of said single layer (105, 106) being spaced from each other so as to have acoustic openings within the acoustic skin. The invention relates to a panel including such a skin, to a method for manufacturing said skin, and to a drape-forming head for implementing the method.

15 Claims, 8 Drawing Sheets

ACOUSTIC SKIN FOR AN AIRCRAFT NACELLE ACOUSTIC PANEL

The present invention relates to an acoustic skin for an aircraft nacelle acoustic panel.

The invention also relates to an acoustic panel comprising such a skin, the method for manufacturing said skin, and a draping head for implementing the method.

Airplane jet engines generate significant noise pollution. There is a high demand to reduce this pollution, particularly as the jet engines used are becoming increasingly powerful. The design of the nacelle surrounding a jet engine contributes in large part to reducing that noise pollution.

In order to further improve the acoustic performance of aircrafts, the nacelles are equipped with acoustic panels aiming to attenuate the noise generated by the jet engines.

Acoustic panels are sandwich-type panels well known for absorbing that noise. These panels usually comprise one or more cellular core structure layers (commonly called "honeycomb" structures). These layers are generally covered, on the so-called outer surface thereof, with an air-impermeable skin, called "solid," and on the inner surface thereof, i.e. the surface in contact with the flow of air and the sound excitation inside the engine, with an air-permeable perforated skin, called "acoustic."

The acoustic panel can also comprise several noise trapping structure layers, in particular with a cellular core, between which a multiperforated skin called a "septum" is located. This skin is generally adhered between the noise-trapping structures by polymerization during the assembly/adhesion phase of the panel.

The acoustic panel is then assembled by arranging the different skins and layers, then glued on a mold with the necessary shape. The assembly is cured in a furnace so as to tighten the layers and polymerize the adhesives.

Such panels make up acoustic resonators capable of "trapping" the noise and therefore attenuating the sound emissions toward the outside of the nacelle.

Typically, the acoustic panels are made from composite materials. Thus, the acoustic panel is generally made up of plies of carbon fiber fabrics preimpregnated with an epoxide or dismaleimide-type resin, for example, which are manually draped. After the draping step, the skin is cured under pressure to polymerize the resin, then perforated with multiple acoustic openings according to a defined perforation level. In that case, certain fibers are cut during the piercing operation, which results in deteriorating the mechanical strength of the acoustic skin and therefore of the acoustic panel comprising said skin.

An alternative exists that consists of draping the plies automatically, by no longer using carbon fibers, but bands of unidirectional carbon fibers, preimpregnated with resin. The draping is then done automatically. In fact, the bands are placed by juxtaposing them or making them partially overlapping. After this placement step, the skin is then cured under pressure to polymerize the resin, as above, then pierced. The separate placement and piercing operations are therefore maintained. The same is true for the decrease in the mechanical strength due to the rupture of certain fibers.

Furthermore, the piercing step as traditionally done causes a significant loss of material of the manufactured skin, which can go up to 40% of the total material. The quantity of fiber waste is therefore high, which requires providing a significant quantity of material. Furthermore, it is necessary to install restrictive specific protection means, such as dust aspiration, since dust is harmful for operators' health.

One aim of the present invention is therefore to provide a composite acoustic skin for an acoustic panel of a nacelle that has a better mechanical strength and whereof the manufacture does not have the aforementioned drawbacks.

To that end, according to a first aspect, the invention relates to an aircraft nacelle acoustic panel, said skin comprising a plurality of layers stacked with composite planar bands that are each directed by the direction-defining longitudinal axis thereof, the longitudinal axes of the bands of a single layer being parallel therebetween, said bands of said single layer being spaced from each other so as to have acoustic openings within the acoustic skin.

"Band" refers to a planar assembly of preimpregnated fibers arranged so as to have a longitudinal axis defining the direction of said assembly, and with a defined width.

"Longitudinal" here refers to the direction following the length of the band and "transverse" refers to the direction along the width of the band, with the understanding that the length of the band is larger than the width thereof.

"Longitudinal median plane" refers to the plan passing through the middle of the band in the longitudinal direction thereof.

The acoustic skin according to the invention is thus made up of a multitude of bands of composite material draped in one or more directions so as to obtain an openwork acoustic skin at the end of the draping phase according to a particular opening density or "degree of opening." The acoustic piercing operation is thus eliminated. As a result, all of the fibers of the acoustic skin are intact, continuous and not pierced, making it possible to preserve the integrity of said fibers. The mechanical strength of the acoustic skin therefore does not deteriorate during the formation of the acoustic skin.

Furthermore, the absence of a piercing step significantly reduces the associated costs as well as the material waste. As a result, it is no longer necessary to install restrictive specific protective means, such as dust aspiration. Furthermore, the quantity of fiber waste is limited, which makes it possible to best adjust the supply of material.

Thus, the acoustic skin according to the invention has the advantage of being made in a limited number of steps by merging the band placement and acoustic opening creation steps. The manufacturing cost is thus limited.

According to other features of the invention, the inventive skin comprises one or more of the following optional features, considered alone or according to all possible combinations:

- the longitudinal axes of the bands of two different layers, which may or may not be adjacent, form a non-zero angle, which makes it possible to adjust the degree of opening;
- the bands have an identical width and the spacing between the bands of a same layer is a multiple of the width of the bands, which makes it possible to use the current automatic draping tools;
- the bands of different layers with parallel longitudinal axes are arranged so that the longitudinal median planes of two bands belonging to two different layers are combined;
- a series of several layers is angularly offset relative to an adjacent series by a predetermined angle relative to the position where the longitudinal median planes of two bands belonging to two layers of two different series are combined;
- a series of several layers is laterally offset by a non-zero distance relative to a different series, which may or may not be adjacent, so that the longitudinal median planes of two bands belonging to two layers of the different series are distinct;

the degree of opening is comprised between 1% and 50%.

According to a second aspect, the invention relates to an acoustic panel comprising at least one structure capable of trapping the noise, a solid skin without acoustic openings, and an acoustic skin according to the invention in contact with the structure.

According to another aspect, the invention relates to a method for manufacturing the acoustic skin according to the invention comprising:

step A, in which a multitude of layers are deposited, each layer having bands preimpregnated with resin and spaced apart from one another in a first direction defined by the longitudinal axes of the bands; then step B, in which the resin contained in the bands is polymerized so as to form the acoustic skin.

Preferably, step A comprises:

step A1, in which first bands are deposited spaced apart from one another in a first direction so as to form a first layer;

step A2, in which second bands are deposited on said first layer spaced apart from one another in a second direction so as to form a second layer;

step A3, in which bands are deposited on the layer thus obtained spaced apart from one another in another direction different from the direction of the immediately adjacent layer so as to form another layer;

step A4, in which step A3 is repeated on the layers already deposited so as to obtain a degree of opening comprised between 8% and 20% in the final acoustic skin.

Preferably, the method according to the invention comprises an additional step in which at least two different layers of bands of the same direction are offset laterally by a non-zero distance or angularly by a non-zero angle so that the longitudinal median planes of the bands of said layers are separate.

Preferably, the method according to the invention comprises the additional steps in which, on the edges of the acoustic skin, bands are deposited juxtaposed with one another parallel to the longitudinal axis of the spaced apart bands, then the bands are spaced apart so as to obtain a zone having acoustic openings. This makes it possible to give the acoustic skin thus produced improved mechanical characteristics on the border thereof.

According to another aspect, the invention relates to a draping head to implement the inventive method, said head comprising a first portion capable of depositing bands with a first spacing and a second portion capable of depositing bands with a second spacing different from the first spacing. This particular arrangement of the deposition head makes it possible to obtain more degrees of freedom in the design of the draping so as to obtain the desired number of layers of bands and the desired degree of opening at the same time.

Preferably, the first spacing is equal to a whole multiple of the width of the bands.

Preferably, the second spacing is not a whole multiple of the width of the bands.

The invention will be better understood upon reading the following non-limiting description, done in reference to the appended figures.

Figure 1:
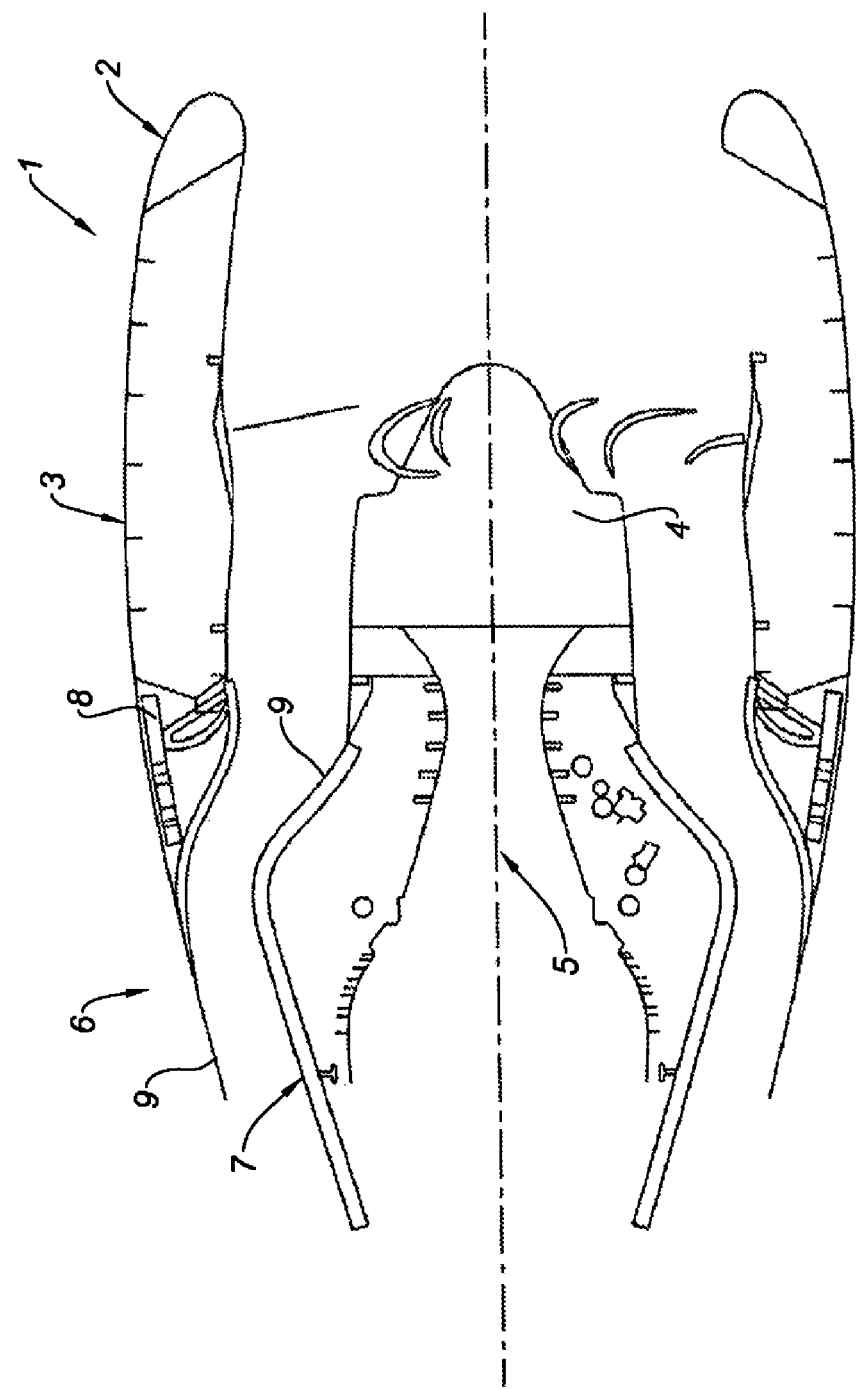
FIG. 1 is a longitudinal diagrammatic cross-sectional illustration of a first embodiment of a nacelle according to the invention.

According to the embodiment illustrated in FIG. 1, a nacelle 1 according to the invention comprises an upstream air intake structure 2, a middle structure 3 surrounding a fan 4 of a turbojet engine 5, and a downstream structure. The downstream structure comprises, in a known manner, an outer structure 6, called OFS, housing thrust reverser means 8, and an inner structure 9, called IFS. The nacelle 1 according to the invention is fastened downstream using any suitable means, in particular connecting rods, to a suspension pylon, not shown, intended to fasten the nacelle 1 under an aircraft wing.

The outer structure 6 and the inner structure 9 also define an annular flow channel.

The inner structure 9 is intended to cover a downstream portion of the turbojet engine 5 extending downstream of the fan.

Figure 2:
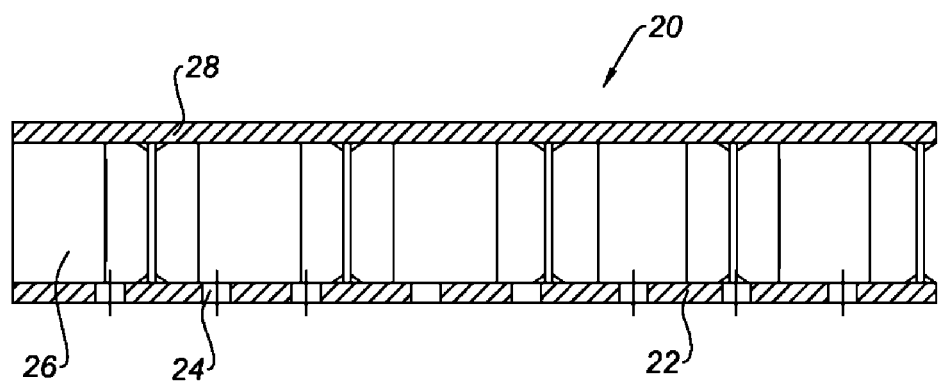
FIG. 2 is a transverse cross-section of one embodiment of an acoustic panel according to the invention.

Certain parts of the nacelle 1 according to the invention must be arranged so as to attenuate the noise created by the turbojet engine 5. To that end, said portions comprise one or more acoustic panels. According to one embodiment of an acoustic panel shown in FIG. 2, the acoustic panel 20 according to the invention comprises a first acoustic skin 22 intended to be mounted on the nacelle 1 on the side of the air flow present in the annular flow channel. This acoustic skin 22 has openings 24 through which the noise penetrates. The size of the openings 24 and their spacing are defined so that the ratio between the open surface area and the total surface area comprising the openings 24 enables the desired noise absorption.

On this acoustic skin 22 is a structure 26 capable of trapping the noise, in particular with a cellular core or made from foam. In the case of a cellular core structure, the latter is typically made from a light alloy, such as aluminum.

On this structure 26 is an unperforated and non-acoustic solid skin 28 intended to close the absorbent honeycomb cells of the structure 26.

These three layers 22, 26 and 28 are in particular secured to one another by adhesion or any other assembly means.

The acoustic 22 and solid 28 skins are made from a carbon and/or glass fiber-based material.

According to the invention, the acoustic skin 22 comprises a plurality of stacked layers of composite planar bands that are each directed by their direction-defining longitudinal axis, the longitudinal axes of the bands of a same layer being parallel to each other, said bands of the same layer being spaced apart from one another so as to have acoustic openings in the acoustic skin.

Thus, the resin bands preimpregnated with resin are not attached edge-to-edge or by overlapping, but rather have spaces between them. In other words, the bands of a same layer are not in contact with one another. The alternation of the layers is done so as to obtain acoustic openings in which the noise is capable of penetrating.

The resin used to preimpregnate the composite fibers is polymerizable at a temperature comprised between 50 and 250° C. The polymerization of the resin results in forming a matrix giving cohesion to the inventive skin. Nevertheless, the polymerization step is made without obstructing the acoustic openings formed in the band placement step. The resin can be chosen from amongst thermosetting resins such as epoxide or bismaleimide resins.

Typically, the number of layers of a skin according to the invention is comprised between 3 and 20, depending on the required mechanical strength.

Each band of a layer has a longitudinal axis defining the direction of said band.

Typically, the length along the longitudinal axis of a band is greater than 50 mm. The maximum length corresponds to the length of the acoustic skin to be draped, i.e. several meters. The width along the transverse axis of a band is comprised between 1 mm and 20 mm, or between 2 mm and 4 mm.

The bands of two different layers, whether or not they are immediately adjacent, can have their longitudinal axes form a non-zero angle between them, in particular comprised between 0° and 90°, or equal to about 45° or about 60°. In other words, said bands can have a different direction, which makes it possible to adjust the number of acoustic openings and also the mechanical strength of the acoustic skin 22 thus obtained. The "degree of opening" is then defined as the ratio of the surface area occupied by the acoustic openings to the total surface area of the acoustic skin.

The degree of opening depends on how the bands are draped, i.e. whether the longitudinal axes of the bands of two adjacent layers are collinear, and also the orientation of the stack of layers.

In the event the bands of different layers are draped in a single direction (not shown), i.e. the longitudinal axes form a substantially non-zero angle between two adjacent layers, the degree of opening can go up to a value equal to 50% when the distance between two consecutive bands is equal to the width of a band. In the event the layers are stacked with certain layers angularly and/or laterally offset, the degree of opening decreases and becomes lower than 50%.

"Lateral offset" here refers to a shift done from the position where the longitudinal median planes of two bands belonging to two different layers are combined, then the layer to be offset is shifted along an axis collinear to the planes formed by the layers of bands. In one particular case, the lateral shift can be done along the axis perpendicular and coplanar to the longitudinal axis of the bands of the layer to be offset. Typically, the shift is done over a distance comprised between 0 mm and the geometric period of the placement pattern of the bands. A larger number of smaller openings are then formed than if the layers were stacked while being substantially all overlapping and keeping the same geometric shape.

"Angular offset" here refers to a shift done from the position where the longitudinal median planes of two bands belonging to two different layers are combined, then the layer to be offset is pivoted as far as the desired angle, for example, 30°, 45° or 60° relative to the position. Likewise, a larger number of smaller openings are then formed than if the layers were stacked while being substantially superimposed with generally different geometric shapes.

It is thus possible to vary, by an angular or lateral offset of one or more layers, the value of the degree of opening, the shape and size of the openings, as well as the direction of best mechanical strength of the fibers. For example, it is possible to offset every other layer, one out of every four layers, or one out of every six layers. Typically, a plurality of series of layers are defined comprising at least two adjacent layers. In this way, it is possible to have two or more series, in particular three, four or five series. At least one series is angularly or laterally offset relative to another series.

Advantageously, in that case, the degree of opening can be adapted as needed by using a same draping means to produce different acoustic skins having different degrees of opening.

Figure 3:
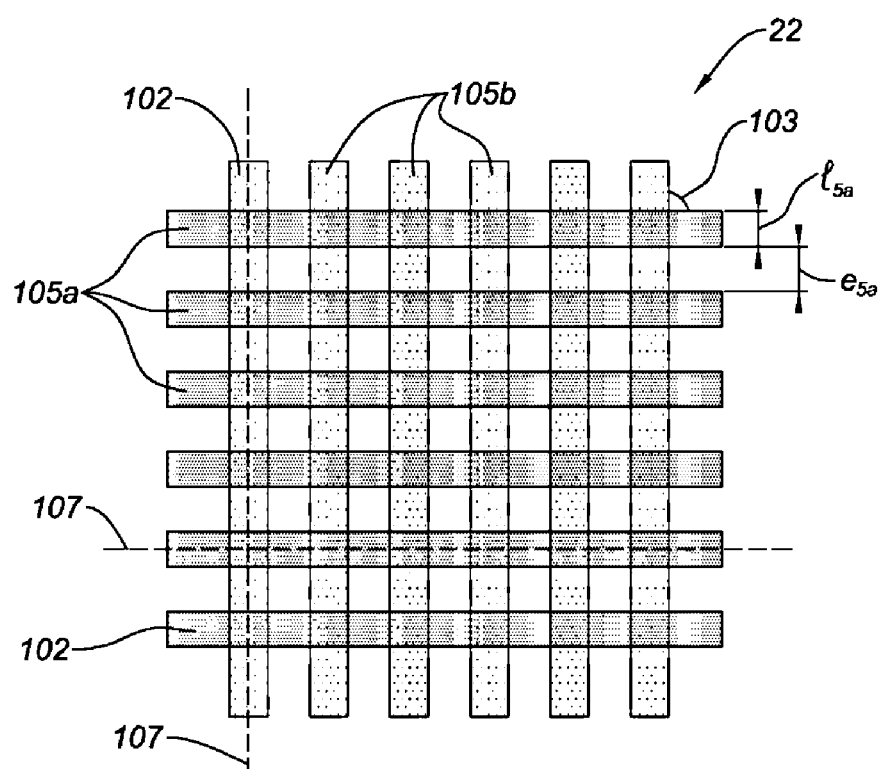
FIG. 3 is a diagrammatic top view of one method for depositing a skin according to the invention.

As illustrated in FIG. 3, the acoustic skin 22 is made up of a plurality of layers 105a and 105b stacked by an angle 103 between the longitudinal axes 107 of the bands 102 of the two immediately adjacent layers 105a and 105b equal to about 90°.

In this case, the degree of opening POA is calculated as follows:

$$POA = (e_{5a} * e_{5b}) / [(I_{5a} + e_{5a}) * (I_{5b} + e_{5b})]$$

With $I_{5a}$ and $I_{5b}$ being the width of the bands of two immediately adjacent layers 105a and 105b and $e_{5a}$ and $e_{5b}$ being the spacing between two bands 102 of a same layer 105a and 105b. The "spacing" is defined here as the distance between two edges of two adjacent bands, the distance being considered perpendicular to the longitudinal axis of the bands.

As a result, the degree of opening depends on the values given to the parameters $I_{5a}$, $I_{5b}$, $e_{5a}$ and $e_{5b}$.

Typically, the bands 102 can have an identical width $I_{5a}$, $I_{5b}$. In that case, the spacing $e_{5a}$, $e_{5b}$ between the bands 102 of a same layer 105a and 105b, respectively, can then be a whole multiple of the width $I_{5a}$, $I_{5b}$ of the bands, for example 2, 3 or 4 (see FIG. 5). On the contrary, the spacing $e_{5a}$, $e_{5b}$ between the bands 102 may not be a whole multiple of the width $I_{5b}$, $I_{5b}$ of said bands, which typically occurs during a lateral shift. In that case, the spacing can assume different discrete values equal to (n−1)/2 times the width of the band with n being an integer equal to the number of bands not deposited between two consecutive bands of a same layer.

In the case where the spacing $e_{5a}$, $e_{5b}$ of the bands of a same layer 105a, 105b is equal to a multiple of the width $I_{5a}$, $I_{5b}$ of said bands, it is advantageously possible to keep the usual draping tools.

Thus, in the case of FIG. 3, i.e. in the event the parameters $I_{5a}$, $I_{5b}$, $e_{5a}$ and $e_{5b}$ are equal, the degree of opening is equal to about 25%.

Figure 4:
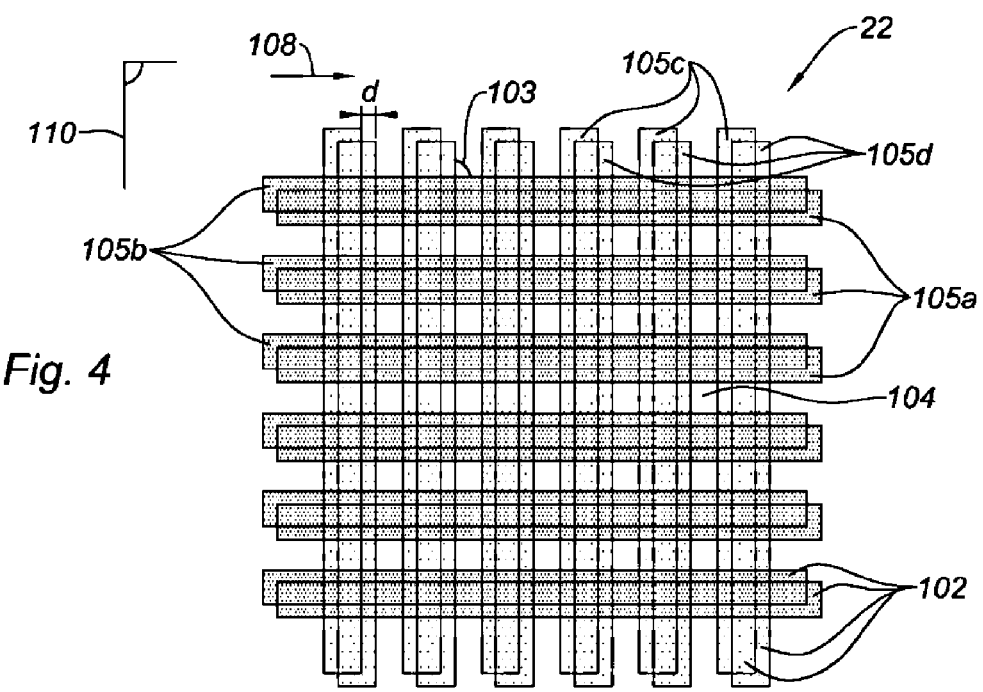
FIGS. 4 to 6 are diagrammatic top views of alternatives of the embodiment of FIG. 3.
Figure 5:
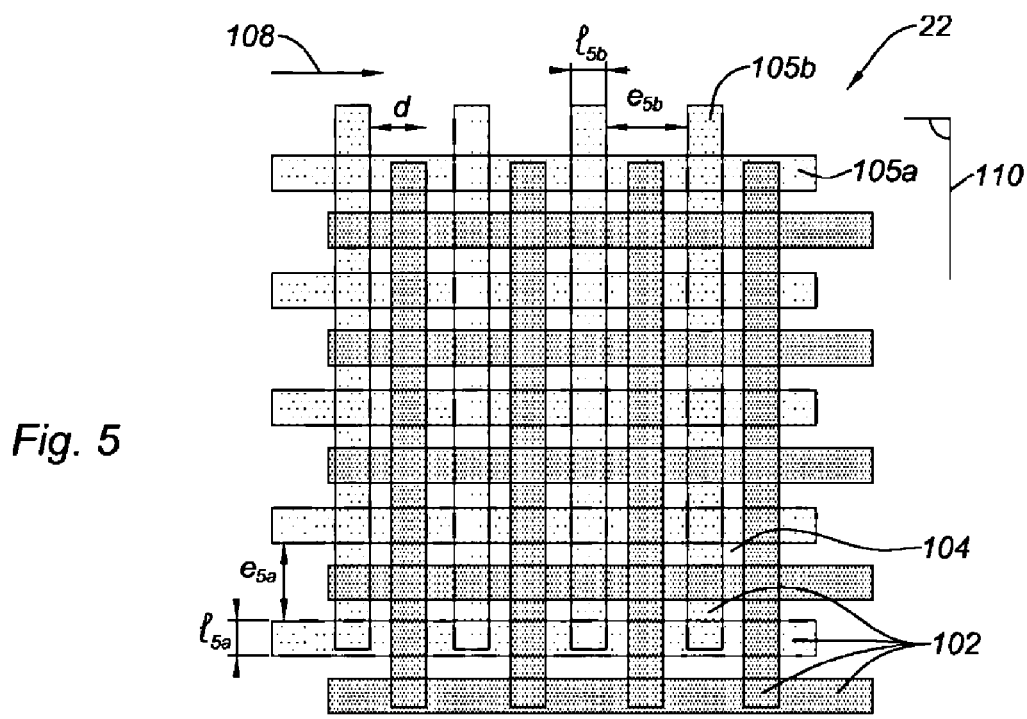

As shown in FIGS. 4 and 5, the bands 102 have longitudinal axes collinear to those of the case of FIG. 3, but two layers 105c and 105d out of four 105a, 105b and 105c, 105d are laterally offset by a non-zero distance. The shift is done laterally, i.e. in a direction 108 coplanar to the plane 110 formed by the layers 105a, 105b, 105c and 105d. In that case, the offset is done over a non-zero distance smaller than the spacing $e_{5a}$ and $e_{5b}$. It is then possible to obtain a degree of opening comprised between 0% and 25% and therefore intermediate relative to that of the embodiment of FIG. 3.

Figure 6:
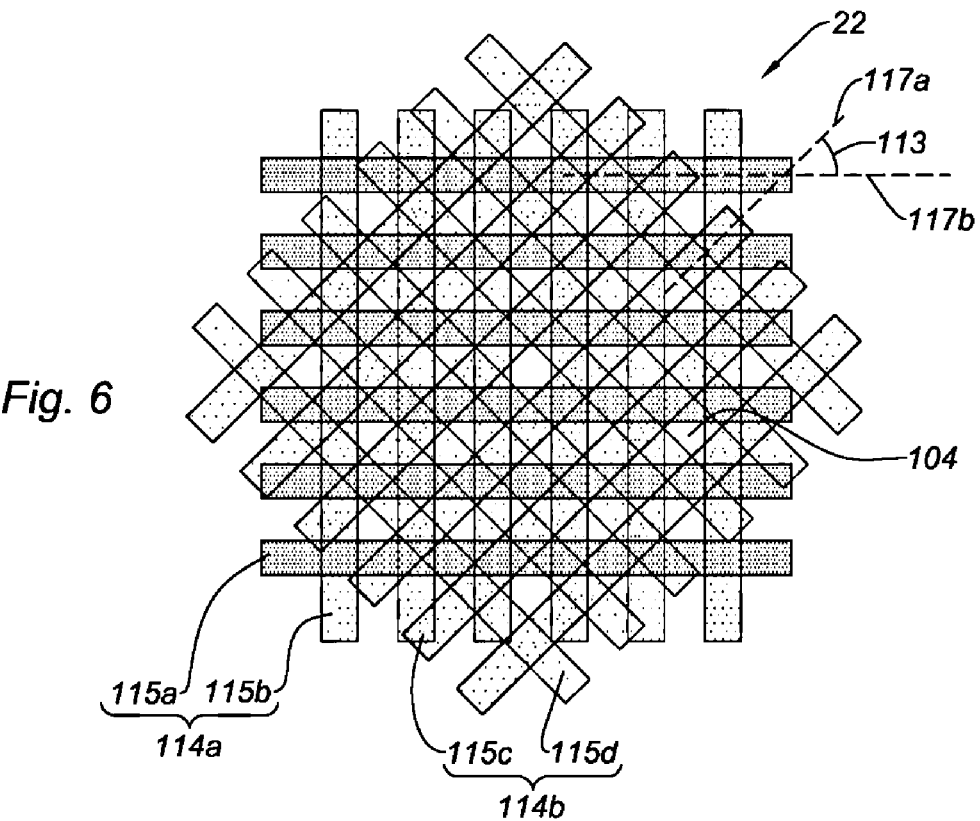

As shown in FIG. 6, in the case of an angular offset of several layers 115a, 115b, 115c and 115d, a first series 114a of layers 115a, 115b and a second series 114b of layers 115c, 115d are defined in which the immediately adjacent layers 115a, 115c and 115b, 115d have bands 102 spaced apart that are arranged substantially perpendicular.

The second series 114b of layers 115c, 115d is offset by an angle 113 substantially equal to 45°, the angle 113 then corresponding to that formed by the two longitudinal axes 117a and 117b of the bands belonging to an offset layer 115c and a non-offset layer 115a.

This embodiment advantageously makes it possible to improve the isotropy of the mechanical strength of the acoustic skin 22.

Figure 7:
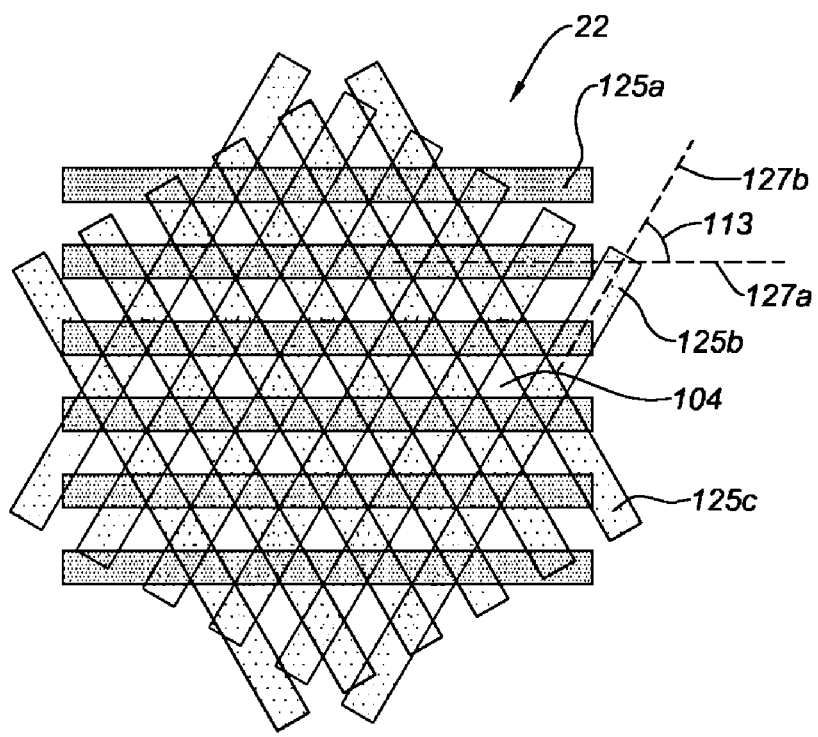
FIG. 7 is a diagrammatic top view of an alternative of the embodiment of FIG. 3.

According to another embodiment shown in FIG. 7, the acoustic skin 22 can be formed by a stack of layers 125a, 125b and 125c whereof the bands 102 are arranged forming an angle 113 substantially equal to 60° corresponding to the angle formed by the longitudinal axis 127a and 127b of two bands belonging to two immediately adjacent layers 125a and 125b. In the case of FIG. 7, the spacing between each band 102 is substantially equal to the width of a band 102.

The advantage of such a configuration lies in the fact that the isotropy of the material is preserved. Furthermore, it is possible to keep the current draping tools.

In this configuration, the degree of opening is typically comprised between 6.25% and 18.75%, this level depending primarily on the stack as in the case of a configuration at 90° as shown in FIGS. 3 to 6. Thus, if each layer 125*a,* 125*b* or 125*c* is formed with bands 102 whereof the spacing is substantially equal to the width of a band, then the degree of opening is equal to 12.5%, as is the case in FIG. 7.

In the event one of the layers is laterally offset in direction 128, it is possible to obtain a degree of opening of 6.25% or 18.75% (see FIG. 8 and FIG. 9, respectively), or any other value comprised between these extremes for intermediate offsets.

Figure 8:
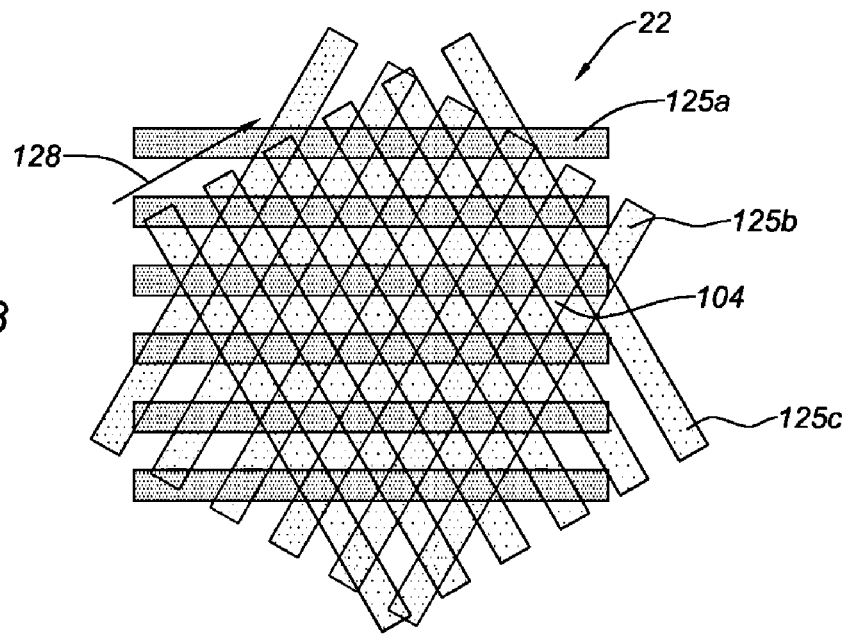
FIGS. 8 to 13 are alternatives of the embodiment of FIG. 7.
Figure 9:
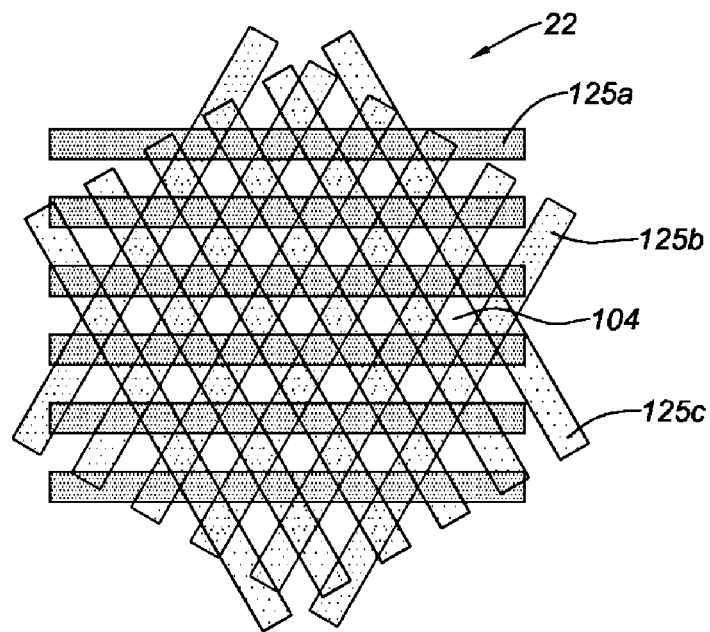

Furthermore, as shown in FIGS. 7 to 9, it is possible to adjust the shape of the openings 104 as well as their concentration through a lateral shift. In the case of FIGS. 7 and 8, the openings 104 assume the form of a triangle, smaller in the case of FIG. 8. In the case of FIG. 9, the openings 104 are hexagonal.

Figure 10:
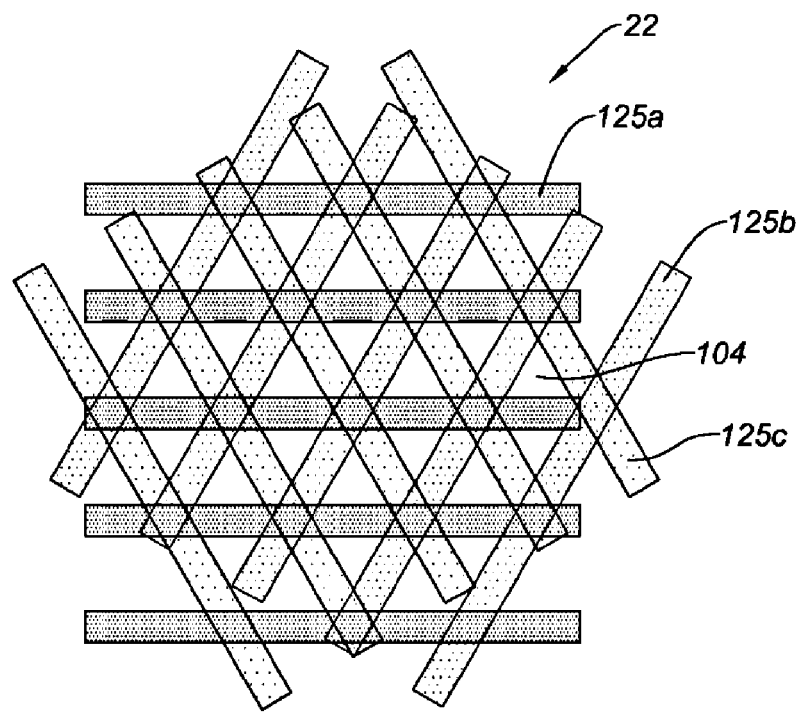
Figure 11:
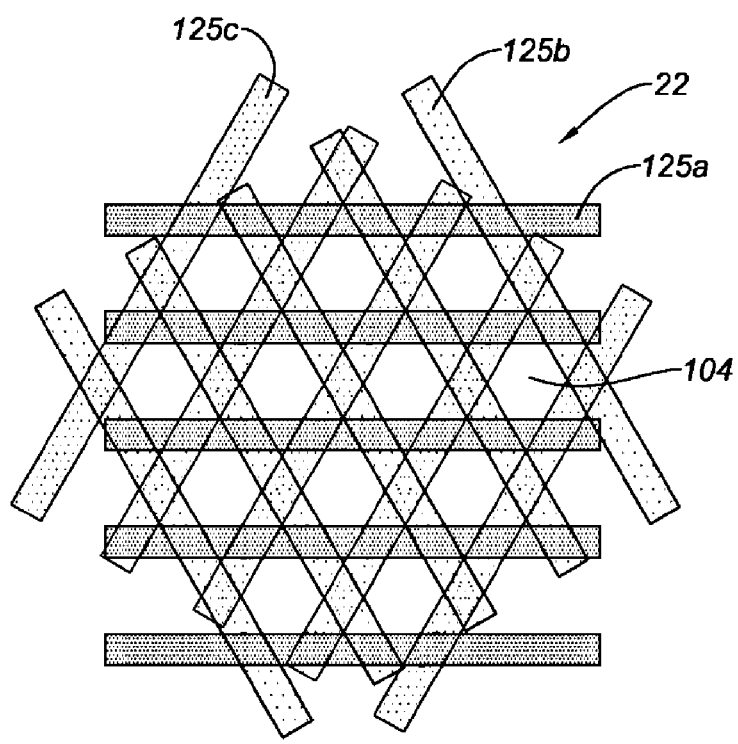
Figure 12:
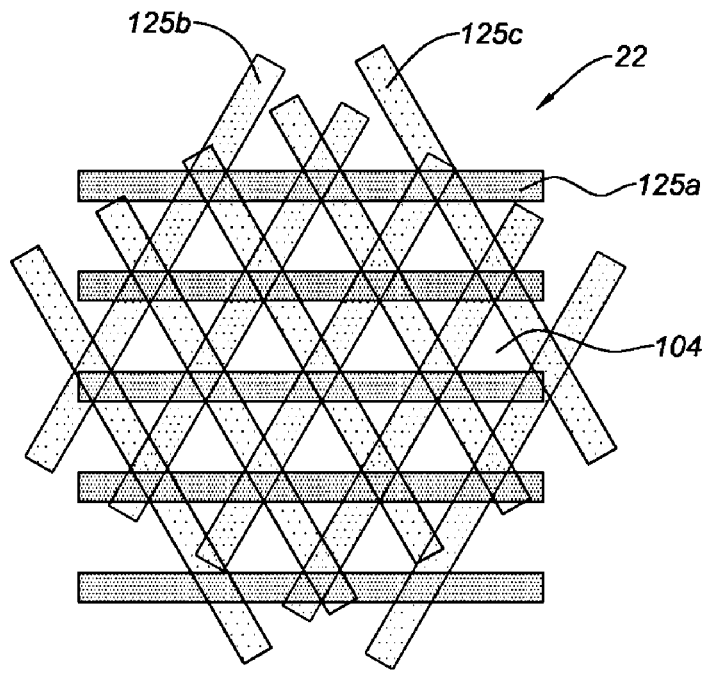

According to an alternative shown in FIGS. 10 to 12, it is possible to increase the spacing between the bands 102. In the case of these figures, the spacing is multiplied by two, i.e. the spacing corresponds to the width of two bands 102.

As indicated above, by laterally shifting a layer 125*a,* 125*b* and 125*c,* it is possible to vary the shape of the openings as well as the concentration thereof. As a result, it is possible to obtain a degree of opening comprised between 25% and 33.33% (see FIG. 10 and FIG. 12, respectively) and in particular an intermediate degree of opening substantially equal to 27.78% (see FIG. 11).

Furthermore, by adding an additional layer with a direction equal to one of the layers already deposited and offsetting the longitudinal axis, it is possible to reduce the degree of opening continuously up to the desired value (see FIG. 13), while increasing the mechanical properties of the skin thus obtained.

The invention also relates to a method for manufacturing an acoustic skin 22 according to the invention. The inventive method comprises:
- step A, in which a multitude of layers 105, 105*a;* 105*b;* 115*a;* 115*b;* 125*a;* 125*b;* 125*c* 106, 116*b* are deposited, each layer 105, 105*a;* 105*b;* 115*a;* 115*b;* 125*a;* 125*b;* 125*c* 106, 116*b* having bands 102 spaced apart from one another in a same direction defined by the longitudinal axes 107, 117*a,* 117*b,* 127*a,* 127*b;* then
- step B, in which the resin contained in the bands 102 is polymerized to form the acoustic skin 22 according to the invention.

The polymerization of the resin is done by curing in a furnace at a temperature comprised between 50° C. and 250° C. and at a pressure comprised between 2 bar and 7 bar.

Step A of the inventive method can also comprise:
- step A1, in which first bands 102 are deposited spaced apart from one another in a first direction 107; 117*a;* 127*a* so as to form a first layer 105*a;* 115*a;* 125*a;*
- step A2, in which second bands 102 are deposited on said first layer 105; 105*a;* 115*a;* 125*a* spaced apart from one another in a second direction so as to form a second layer 105*b;* 115*b;* 125*b;*
- step A3, in which bands are deposited on the layer thus obtained spaced apart from one another in another direction different from the direction of the immediately adjacent layer so as to form another layer;
- step A4, in which step A3 is repeated on the layers already deposited 105*a;* 115*a;* 125*a;* 105*b;* 115*b;* 125*b* so as to obtain a degree of opening comprised between 8% and 20% in the final acoustic skin 22.

A degree of opening comprised between 8% and 20% makes it possible to have both good absorption and good mechanical structural strength.

The method according to the invention comprises an additional step in which at least two different layers of bands with collinear longitudinal axes are offset laterally by a non-zero distance d or angularly by a non-zero angle so that the longitudinal meridian planes of the bands of said layers are distinct. For example, out of three layers 135*a,* 135*b,* 135*c,* two layers 135*b,* 135*c* of bands with collinear longitudinal axes are offset (see FIG. 13).

Figure 13:
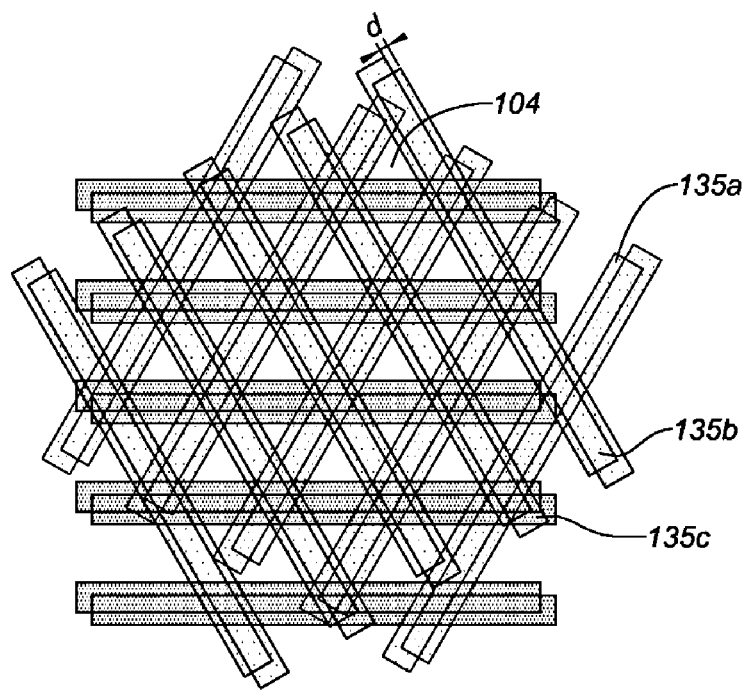

In the case of FIG. 13, the bands of two adjacent layers 135*a,* 135*b,* 135*c* form an angle of 60°.

Advantageously, offsetting the bands 102 from one layer to the next in a same direction makes it possible to reduce the local overthicknesses at the intersections of the bands 102. These overthicknesses are detrimental to the proper adhesion of the cellular core structure 26 on the acoustic skin 22 of the invention.

Figure 14:
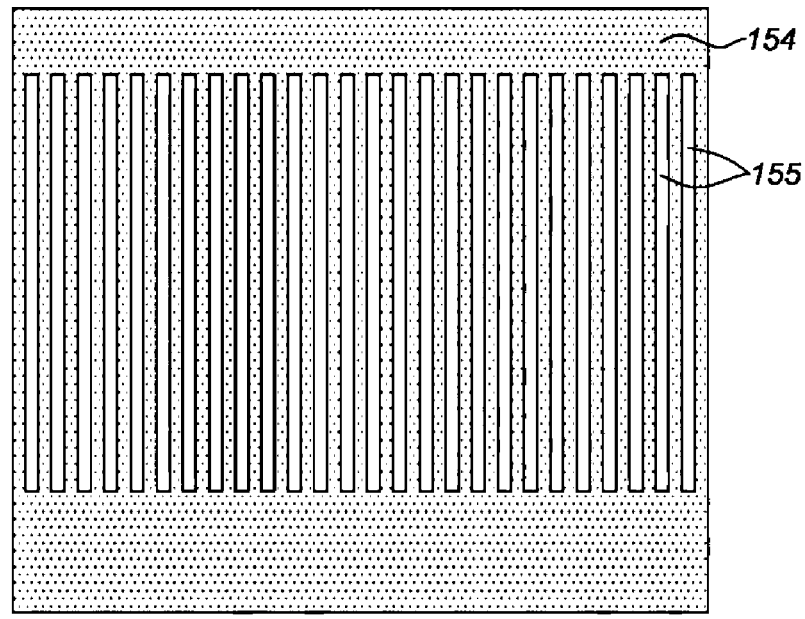
FIGS. 14 and 15 are top views of other embodiments of the skin according to the invention.

The method according to the invention can also comprise the additional steps in which, on the edges of the acoustic skin 22, bands 154 are positioned juxtaposed with one another in the direction collinear to the longitudinal axis of the spaced apart bands, then the bands are spaced apart so as to obtain a zone having acoustic openings. Thus, in the zone intended to have the acoustic openings, from a certain point, certain bands 154 are therefore no longer deposited so as to deposit only the bands 155 and thereby create the acoustic openings described above (see FIG. 14).

This makes it possible to position the bands 102 more easily at the beginning and end of each placement trajectory of said bands 102. Thus, the bands 102 are correctly positioned along the entire placement trajectory.

Figure 15:
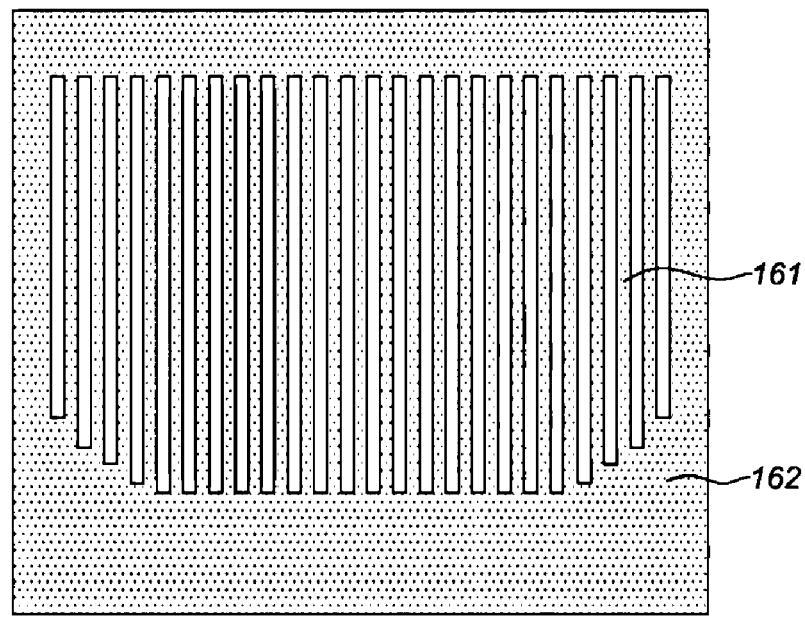

Such a configuration also makes it possible to reinforce the mechanical strength of the acoustic skin 22 at the edge. It is thus possible to produce an acoustic skin 22 in a single step having a transition between the acoustic zone 161 and the non-acoustic zone 162 (see FIG. 15). The transition can have any shape adapted to the needs.

The invention also comprises a draping head (not shown) to implement the method according to the invention, said head comprising a first portion capable of depositing bands 102 with a first spacing and a second portion capable of depositing bands 102 with a second spacing different from the first spacing.

More particularly, the bands 102 are divided into two groups managed on either side of the head. The first group is managed so as to have a spacing corresponding to a whole multiple of the width of the bands and the second group has a different spacing, i.e. not equal to a whole multiple of the width of the bands. Thus, in one alternative, the spatial period for the second layer is along the axis forming a 45° angle with the longitudinal axis of the bands of that layer equal to about $(2\sqrt{2}-1)$ times the width of the band.

Thus, during the production of an acoustic skin 22, the degree of opening of the obtained skin is comprised between 12.5% and 2.145% depending on the alignment of the offset and non-offset layers.

Advantageously, the degree of opening thus obtained is homogenous and periodic.

The invention claimed is:

1. An aircraft nacelle acoustic panel comprising:
   at least one structure capable of trapping noise,
   a solid skin without acoustic openings and
   an acoustic skin in contact with said structure, said acoustic skin consisting of a plurality of layers stacked with composite planar bands that are each directed by direction-defining longitudinal axis thereof, the longitudinal axes of the bands of a single layer being parallel therebetween, said bands of said single layer being spaced from each other so as to have acoustic openings within the acoustic skin.

2. The acoustic panel according to claim 1, wherein the longitudinal axes of the bands of two different layers form a non-zero angle.

3. The acoustic panel according to claim 2, wherein the angle formed between the longitudinal axes is equal to approximately 60°, 45° or 90°.

4. The acoustic panel according to claim 1, wherein in each layer, the bands have an identical width and a spacing between the bands of a same layer is a multiple of the width of the bands.

5. The acoustic panel according to claim 1, wherein the bands of different layers with parallel longitudinal axes are arranged so that the longitudinal median planes of two bands belonging to two different layers are combined.

6. The acoustic panel according to claim 1, wherein a series of several layers is angularly offset relative to an adjacent series by a predetermined angle relative to a position where the longitudinal median planes of two bands belonging to two layers of two different series are combined.

7. The acoustic panel according to claim 1, wherein a series of several layers is laterally offset by a non-zero distance relative to a different series, which may or may not be adjacent, so that longitudinal median planes of two bands belonging to two layers of the different series are distinct.

8. The acoustic panel according to claim 1, wherein a degree of opening is comprised between 1% and 50%.

9. A method for manufacturing an acoustic panel according to claim 1, the method comprising:

step A, in which the plurality of layers are deposited, each layer having bands preimpregnated with resin and spaced apart from one another in a first direction defined by longitudinal axes of the bands to define the acoustic openings; then step B, in which the resin contained in the bands is polymerized so as to form the acoustic skin.

10. The method according to claim 9, wherein step A comprises:

step A1, in which first bands are deposited spaced apart from one another in a first direction so as to form a first layer;

step A2, in which second bands are deposited on said first layer spaced apart from one another in a second direction so as to form a second layer;

step A3, in which bands are deposited on the layer thus obtained spaced apart from one another in another direction different from the direction of the immediately adjacent layer so as to form another layer;

step A4, in which step A3 is repeated on the layers already deposited so as to obtain a degree of opening comprised between 8% and 20% in the final acoustic skin.

11. The method according to claim 9, comprising an additional step in which at least two different layers of bands of the same direction are offset laterally by a non-zero distance or angularly by a non-zero angle so that the longitudinal median planes of the bands of said layers are separate.

12. The method according to claim 9, comprising the additional steps in which, on edges of the acoustic skin, bands are deposited juxtaposed with one another parallel to the longitudinal axis of the spaced apart bands, then the bands are spaced apart so as to obtain a zone having acoustic openings.

13. A draping head to implement the method according to claim 9, said head comprising a first portion capable of depositing bands with a first spacing and a second portion capable of depositing bands with a second spacing different from the first spacing.

14. The head according to claim 13, wherein the first spacing is equal to a whole multiple of a width of the bands.

15. The head according to claim 13, wherein the second spacing is not a whole multiple of a width of the bands.

* * * * *